(12) United States Patent
Toratani

(10) Patent No.: US 6,587,150 B1
(45) Date of Patent: Jul. 1, 2003

(54) IMAGE PROCESSING APPARATUS AND CONTROL METHOD THEREFOR

(75) Inventor: Yasumasa Toratani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/031,895

(22) Filed: Feb. 27, 1998

(30) Foreign Application Priority Data

Feb. 28, 1997 (JP) .............................................. 9-046652

(51) Int. Cl.[7] .................... H04N 5/225; H04N 9/083; G05D 3/12; G06F 1/32
(52) U.S. Cl. ..................... 348/372; 348/270.1; 700/297; 713/323
(58) Field of Search ................................ 348/552, 372, 348/14.03, 14.08, 14.09, 207, 159, 207.1; 700/297; 713/323

(56) References Cited

U.S. PATENT DOCUMENTS

| | | | | |
|---|---|---|---|---|
| 5,426,733 A | * | 6/1995 | Masui | 345/574 |
| 5,477,264 A | * | 12/1995 | Sarbadhikari et al. | 348/552 |
| 5,483,656 A | * | 1/1996 | Oprescu et al. | 700/297 |
| 5,768,604 A | * | 6/1998 | Yamazaki et al. | 713/323 |
| 5,860,001 A | * | 1/1999 | Cromer et al. | 713/1 |
| 6,005,613 A | * | 12/1999 | Endsley et al. | 348/552 |
| 6,122,005 A | * | 9/2000 | Sasaki et al. | 348/211 |
| 6,157,734 A | * | 12/2000 | Iida | 382/162 |
| 6,177,956 B1 | * | 1/2001 | Anderson et al. | 348/207 |
| 6,220,687 B1 | * | 4/2001 | Takahashi et al. | 347/5 |
| 6,334,161 B1 | * | 12/2001 | Suzuki et al. | 710/29 |

FOREIGN PATENT DOCUMENTS

| | | | |
|---|---|---|---|
| JP | 63-047863 | 2/1988 | |
| JP | 5-131726 | 5/1993 | |
| JP | 06-090299 | * 3/1994 | .......... H04M/11/00 |
| JP | 6-122254 | 5/1994 | |
| JP | 6-230905 | 8/1994 | |
| JP | 8-032911 | 2/1996 | |
| JP | 8-224942 | 9/1996 | |
| JP | 8-224944 | 9/1996 | |
| JP | 10-191246 | 7/1998 | |

* cited by examiner

Primary Examiner—Wendy R. Garber
Assistant Examiner—Lin Ye
(74) Attorney, Agent, or Firm—Fitzpatrick, Cella, Harper & Scinto

(57) ABSTRACT

An input library and input attribute corresponding to input processing for image data from each of a plurality of types of image input devices are stored in a ROM. The image input device connected to an image processing apparatus is designated with a keyboard. The input library and input attribute corresponding to the designated image input device are acquired from the ROM. Input processing for image data from the image input device is executed on the basis of the input library and input attribute.

13 Claims, 6 Drawing Sheets

FIG. 5

INPUT LIBRARY NAME TABLE

| | |
|---|---|
| 1 | IMAGE LIBRARY NAME 1 |
| 2 | IMAGE LIBRARY NAME 2 |
| 3 | IMAGE LIBRARY NAME 3 |
| | ⋮ |
| | ⋮ |
| | ⋮ |
| | ⋮ |
| n | IMAGE LIBRARY NAME n |

FIG. 6

INPUT ATTRIBUTE TABLE

| | |
|---|---|
| 1 | INPUT ATTRIBUTE 1 |
| 2 | INPUT ATTRIBUTE 2 |
| 3 | INPUT ATTRIBUTE 3 |
| | ⋮ |
| | ⋮ |
| | ⋮ |
| | ⋮ |
| n | INPUT ATTRIBUTE n |

COMPONENTS OF ONE PIXEL

IMAGE PROCESSING APPARATUS AND CONTROL METHOD THEREFOR

BACKGROUND OF THE INVENTION

1. Field of the Invention

The present invention relates to an image processing apparatus which can be connected to a plurality of types of image input devices and receives image data from the devices, and a control method for the apparatus.

2. Related Background Art

Conventionally, an external image storage device such as a digital camera is connected to an image processing apparatus such as a wordprocessor, and color image data input from the connected external image storage device is output to a printer to print a color image. Depending on the types of image storage devices, different control methods are used when image data are input from connected external image storage devices. For this reason, a dedicated control means is generally prepared for each type of external image storage device.

With the recent spread of external image storage devices such as digital cameras, demands have arisen for techniques of minimizing the loads on users in inputting image data. It is especially required that external image storage devices be controllable on the image processing apparatus side by a single control method regardless of the type of external image storage device connected to the image processing apparatus.

SUMMARY OF THE INVENTION

The present invention has been made in consideration of the above problem, and has as its object to provide an image processing apparatus which can be connected to a plurality of types of image input devices and can efficiently receive image data from the a connected image input device, and a control method for the apparatus.

In order to achieve the above object, an image processing apparatus according to the present invention has the following arrangement.

There is provided an image processing apparatus which can be connected to a plurality of types of image input devices and receives image data from the devices, comprising:

storage means for storing power supply operation control information for the plurality of types of image input devices;

designation means for designating an image input device connected to the image processing apparatus; and execution means for acquiring power supply operation control information corresponding to the image input device designated by the designation means from the storage means, and executing control based on the power supply operation control information.

The storage means preferably stores a procedure for performing input processing for image data from each of the plurality of types of image input devices.

The storage means preferably stores a processing attribute corresponding to input processing for image data from each of the plurality of types of image input devices.

The power supply operation control information preferably indicates whether to issue a predetermined command to the image input device.

The predetermined command is preferably a command for keeping ON a power supply of the image input device designated by the designation means.

The predetermined command is preferably a command for keeping open a communication line for connecting the image input device designated by the designation means.

In order to achieve the above object, a control method for an image processing apparatus according to the present invention has the following arrangement.

There is provided a control method for an image processing apparatus which can be connected to a plurality of types of image input devices and receives image data from the devices, comprising:

the storage step of storing power supply operation control information for the plurality of types of image input devices in a storage medium;

the designation step of designating an image input device connected to the image processing apparatus; and the execution step of acquiring power supply operation control information corresponding to the image input device designated in the designation step from the storage medium, and executing control based on the power supply operation control information.

In order to achieve the above object, a computer-readable memory according to the present invention has the following arrangement.

There is provided a computer-readable memory storing program codes for control on an image processing apparatus which can be connected to a plurality of types of image input devices and receives image data from the devices, comprising:

a program code for the storage step of storing power supply operation control information for the plurality of types of image input devices in a storage medium;

a program code for the designation step of designating an image input device connected to the image processing apparatus; and a program code for the execution step of acquiring power supply operation control information corresponding to the image input device designated in the designation step from the storage medium, and executing control based on the power supply operation control information.

In order to achieve the above object, an image processing apparatus according to the present invention has the following arrangement.

There is provided an image processing apparatus which can be connected to a plurality of types of digital cameras and receives image data from the digital cameras, comprising:

storage means for storing input processing information corresponding to input processing for image data from each of the plurality of types of digital cameras;

designation means for designating a digital camera connected to the image processing apparatus; and execution means for acquiring input processing information corresponding to the digital camera designated by the designation means from the storage means, and executing input processing for image data from the digital camera on the basis of the input processing information.

In order to achieve the above object, a control method for an image processing apparatus according to the present invention has the following arrangement.

There is provided a control method for an image processing apparatus which can be connected to a plurality of types of digital cameras and receives image data from the digital cameras, comprising:

the storage step of storing input processing information corresponding to input processing for image data from each of the plurality of types of digital cameras in a storage medium;

the designation step of designating a digital camera connected to the image processing apparatus; and the execution step of acquiring input processing information corresponding to the digital camera designated in the designation step from the storage medium, and executing input processing for image data from the digital camera on the basis of the input processing information.

In order to achieve the above object, a computer-readable memory according to the present invention has the following arrangement.

There is provided a computer-readable memory storing program codes for control on an image processing apparatus which can be connected to a plurality of types of digital cameras and receives image data from the digital cameras, comprising:

a program code for the storage step of storing input processing information corresponding to input processing for image data from each of the plurality of types of digital cameras in a storage medium;

a program code for the designation step of designating a digital camera connected to the image processing apparatus; and a program code for the execution step of acquiring input processing information corresponding to the digital camera designated in the designation step from the storage medium, and executing input processing for image data from the digital camera on the basis of the input processing information.

According to the present invention described above, there is provided an image processing apparatus which can be connected to a plurality of image input devices and efficiently receive image data from the devices, and a method for the apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a view showing the structure of an input library name table in the embodiment of the present invention;

FIG. 6 is a view showing the structure of an input attribute table in the embodiment of the present invention;

DETAILED DESCRIPTION OF THE PREFERRED EMBODIMENT

A preferred embodiment of the present invention will be described in detail below with reference to the accompanying drawings.

Figure 1:
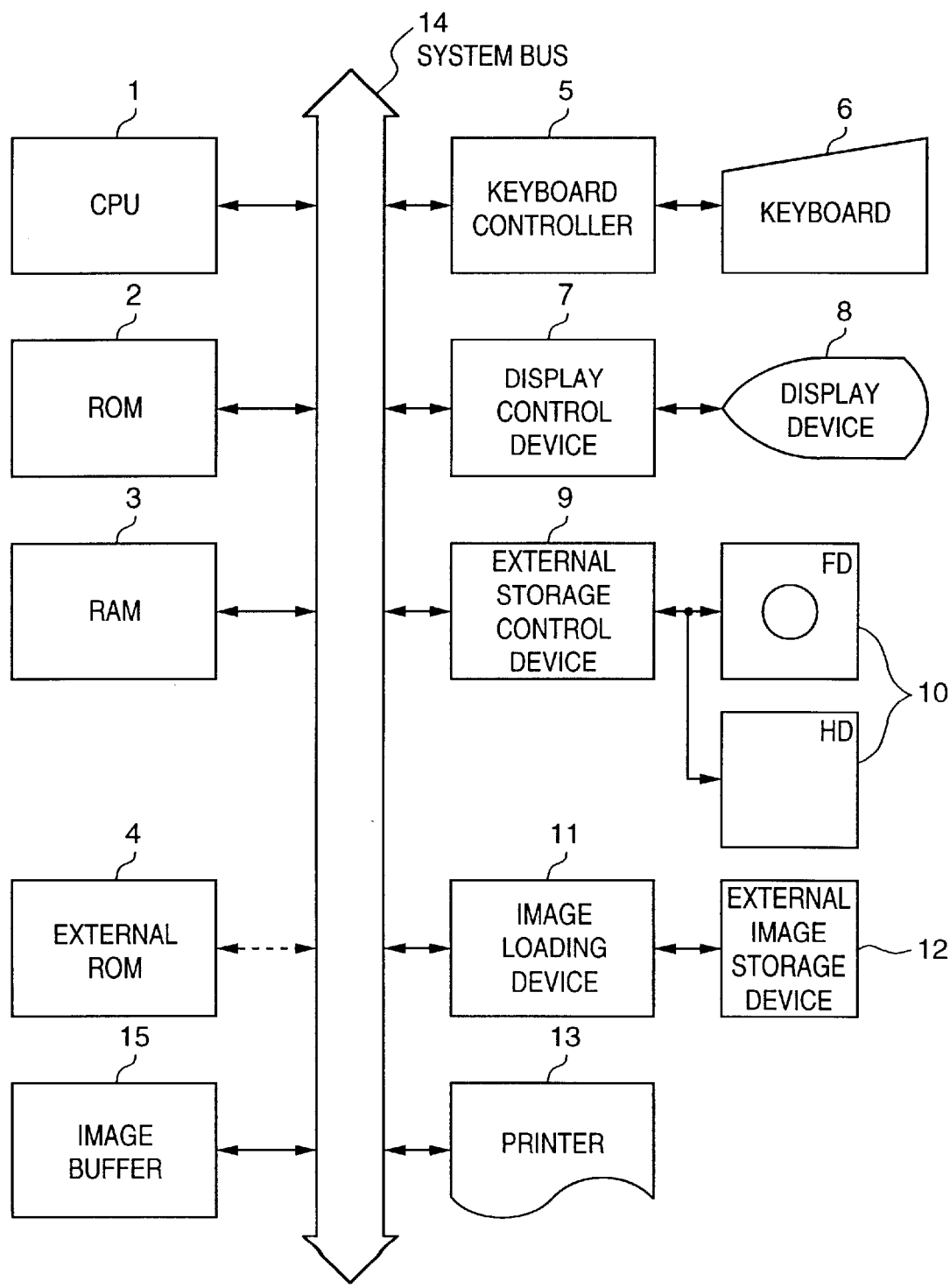
FIG. 1 is a block diagram showing the arrangement of an image processing apparatus according to an embodiment of the present invention.

FIG. 1 is a block diagram showing the arrangement of an image processing apparatus according to an embodiment of the present invention.

Referring to FIG. 1, reference numeral 1 denotes a central processing unit (CPU) for performing various types of control on each constituent element of the image processing apparatus; 2, a read-only memory (ROM) storing various types of programs for processing the data input from a keyboard 6 and executing the processing performed in the present invention; and 3, a random-access memory (RAM) serving as a work area and a save area for various types of programs and the data input from the keyboard 6.

Reference numeral 4 denotes an externally added read-only memory (external ROM); and 5, a keyboard controller for controlling the input operation of the keyboard 6. The keyboard 6 is used to input data. Reference numeral 7 denotes a display control device for controlling the display operation of a display device 8. The display device 8 is a CRT or the like which is used to display the image data input from an image loading device 11, the result obtained by executing processing in this embodiment, and the like.

Reference numeral 9 denotes an external storage control device for controlling data reads/writes of an external storage device 10. The external storage device 10 is a floppy disk (FD) or hard disk (HD) for storing the image data input from an external image storage device 12 and various types of data. Reference numeral 11 denotes an image loading device for loading image data from the external image storage device 12. The external image storage device 12 transfers stored image data to the image loading device 11. Reference numeral 13 denotes a printer for printing an image based on the image data input from the image loading device 11 or the image data displayed on the CRT 8 on a recording medium; 14, a system bus for transmitting/receiving data between the constituent elements of the image processing apparatus; and 15, an image buffer for storing the image data input from the external image storage device 12.

Note that the programs to be executed in this embodiment are sequentially read out by the CPU 1 from the ROM 2 through the system bus 14 or from the ROM 2 onto the RAM 3 to perform desired processing. The image processing apparatus can be connected to a plurality of types of external image storage devices 12. As a typical example of the external image storage device 12, a digital camera is available. Other examples are an SV camera, a video camera, and the like.

The digital camera used in the present invention includes any types of devices, e.g., SV cameras and video cameras, as long as they have two-dimensional area sensors and output digital image signals.

The processing executed in this embodiment will be described next with reference to the flow charts of FIGS. 2 to 4.

The processing to be executed when the image data stored in the external image storage device 12 is input to the image processing apparatus will be described first with reference to the flow chart of FIG. 2.

Figure 2:
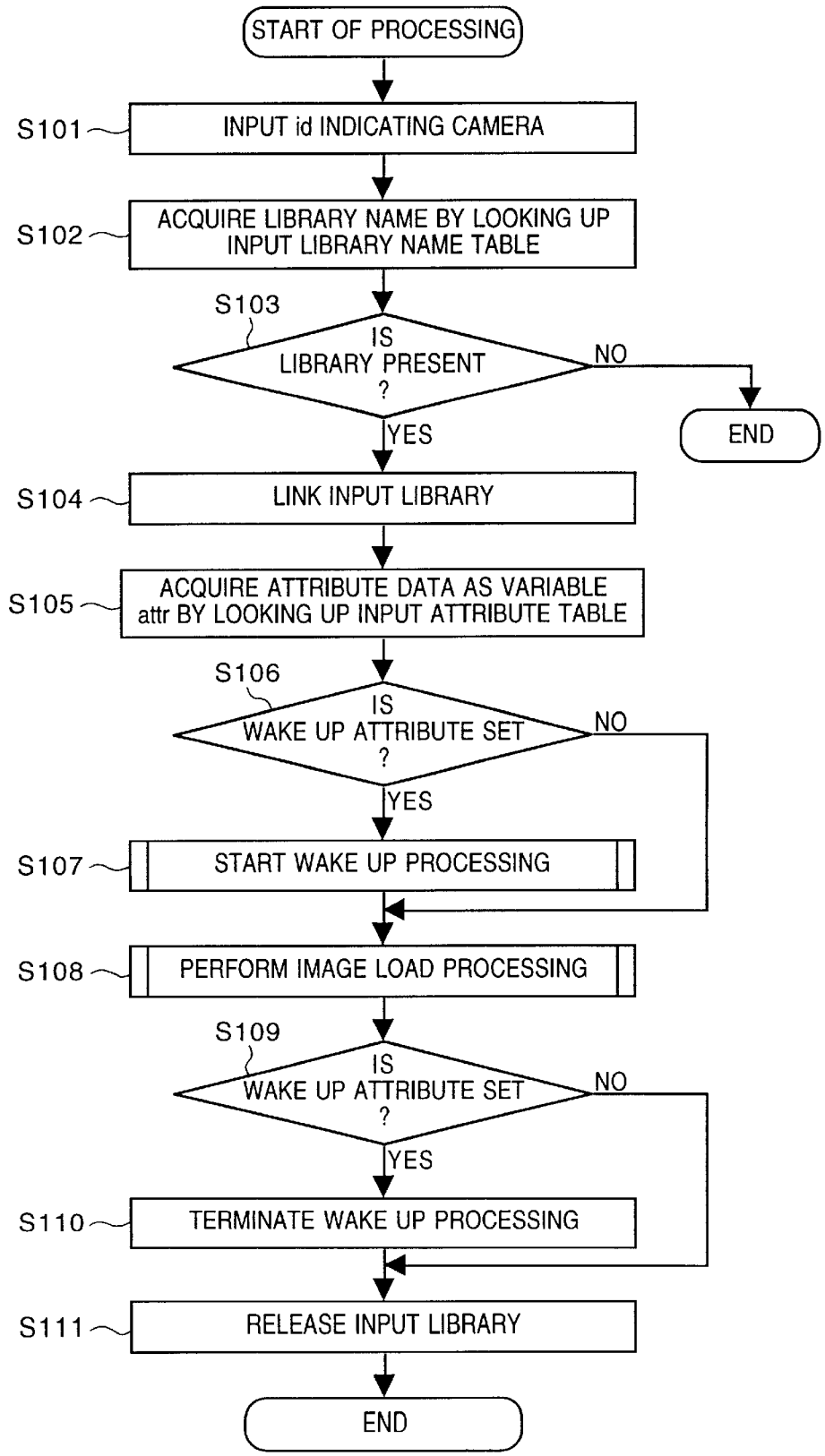
FIG. 2 is a flow chart showing the flow of processing executed in the embodiment of the present invention.

FIG. 2 is a flow chart showing the flow of the processing executed in the embodiment of the present invention.

In step S101, a value (id) for specifying the external image storage device 12 connected to the image processing apparatus is input from the keyboard 6 and held in, for example, the work area of the RAM 3. Note that the value id can take an integer from 1 to n when n types of external image storage devices 12 can be connected to the apparatus. The work area may be prepared on the CPU 1.

In step S102, a library name indicating the input library of the external image storage device 12 specified by the input value id is acquired by looking up an input library name table.

The structure of the input library name table will be described below with reference to FIG. 5.

FIG. 5 is a view showing the structure of the input library name table in the embodiment of the present invention.

Referring to FIG. 5, in the input library name table, library names indicating the input libraries of a plurality of types of external image storage devices 12 which can be connected to the image processing apparatus are stored in the form of character strings for the respective elements. The elements are defined by fixed length, and only n number indicating external image storage devices 12 which can be connected to the image processing apparatus.

Note that an input library is a procedure for processing the image data input from the external image storage device 12. When one of the plurality of types of external image storage devices 12 which can be connected to the image processing apparatus is connected to the apparatus to input image data from the connected storage device 12, the input image data can be optimally processed by using the input library of the storage device 12. As described above, from the viewpoint of the image processing apparatus using input libraries, the image data input from any type of external image storage device 12 connected to the apparatus can be optimally processed by using the input library of this storage device 12. That is, the input library name table can serve as an I/F for coordinating image data input processing.

Note that this input library name table is managed by the ROM 2, the RAM 3, the external ROM 4, or the external storage device 10.

In step S103, it is checked whether the input library indicated by the library name acquired in step S102 is present in the ROM 2, the RAM 3, the external ROM 4, or the external storage device 10 of the image processing apparatus. If this input library is not present (NO in step S103), the processing is terminated. If the input library is present (YES in step S103), the flow advances to step S104. In step S104, the corresponding input library is linked with the storage device 12 to allow image data to be input from the image storage device 12.

In step S105, attribute data indicating the input attributes to be set when the connected external image storage device 12 inputs image data is held in, for example, a work area attr (not shown) of the RAM 3 by looking up an input attribute table on the basis of the acquired library name.

The structure of the input attribute table will be described below with reference to FIG. 6.

FIG. 6 shows the structure of the input attribute table in the embodiment of the present invention.

Referring to FIG. 6, each element of the input attribute table consists of one word. In each element, the input attribute (ON/OFF) of each of the plurality of types of external image storage devices 12 is stored as one bit of one word. Some type of external image storage device 12 has a power saving function of automatically turning off the power supply to save power when the device does not receive any command for a predetermined period of time.

When, therefore, image data is to be input from such external image storage device 12, a wake up command for canceling "power supply OFF" must be issued at predetermined intervals. In this case, a predetermined bit of the attribute data of the external image storage device 12 for which wake up commands need to be issued is turned on to register information indicating the necessity to issue wake up commands. By acquiring attribute data corresponding to a library name from the input attribute table in this manner, the processing required for the input of image data from the connected external image storage device 12, i.e., the processing of issuing wake up commands, can be executed.

The processing to be executed when a predetermined bit, of the acquired attribute data, which indicates the necessity to issue wake up commands is referred to will be described below as an example. Note that this input attribute table is managed in the ROM 2, the RAM 3, the external ROM 4, or the external storage device 10.

In step S106, it is checked, by referring to the attribute data held in the work area attr, whether the attribute indicating the issuance of wake up commands is set. If the attribute indicating the issuance of wake up commands is set (YES in step S106), the flow advances to step S107. If the attribute indicating the issuance of wake up commands is not set (NO in step S106), the flow advances to step S108.

In step S107, wake up processing for issuing wake up commands is started. This processing will be described in detail with reference to the flow chart of FIG. 4.

Figure 4:
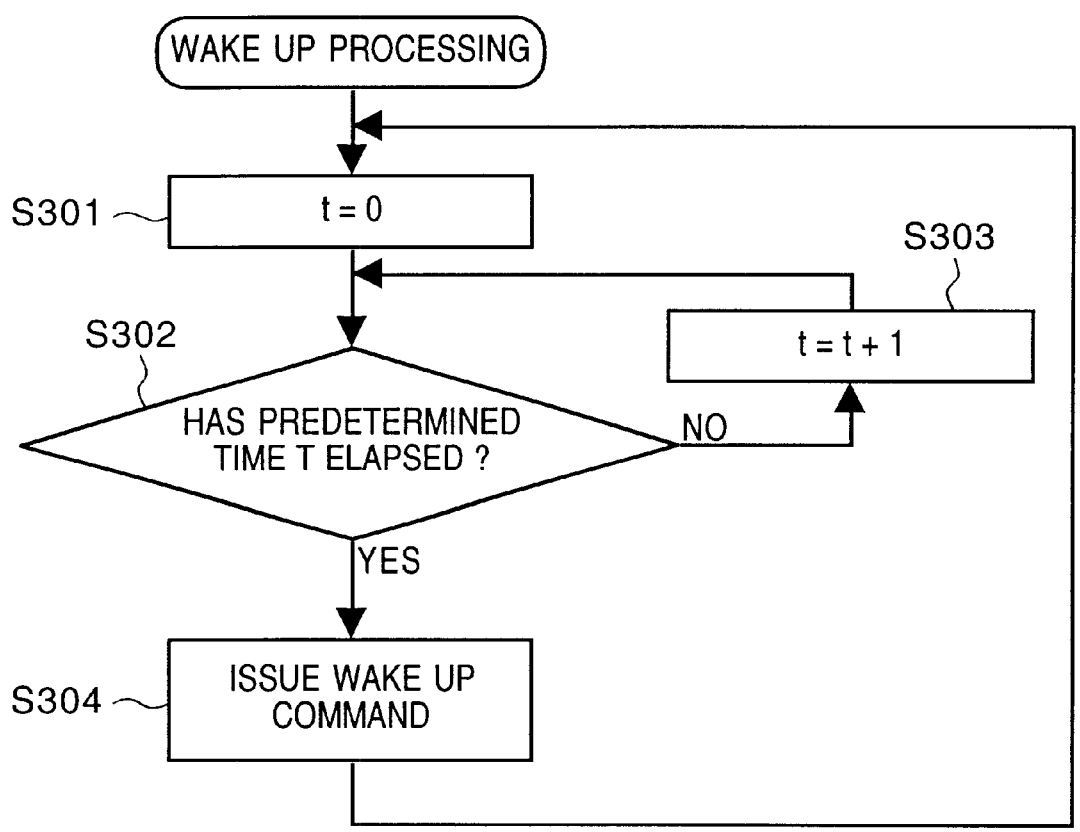
FIG. 4 is a flow chart showing the flow of wake up processing in the embodiment of the present invention in detail.

FIG. 4 is a flow chart showing the flow of wake up processing in the embodiment of the present invention in detail.

Note that the processing for issuing wake up commands is executed concurrently with the processing executed according to the flow chart of FIG. 2. When the processing described with reference to the flow chart of FIG. 4 is started, therefore, the flow in the flow chart of FIG. 2 advances from step S107 to step S108. The processing described with reference to the flow chart of FIG. 4 is executed repeatedly and concurrently with the processing executed according to the flow chart of FIG. 2 until the processing is forcibly terminated in step S110 in the flow chart of FIG. 2.

The wake up processing will be described below with reference to the flow chart of FIG. 4.

This processing begins with "wake up processing".

In step S301, for example, 0 is set in a work area t in the RAM 3. In step S302, it is checked whether the value of the work area t is equal to or larger than a predetermined time T. If the value of the work area t is less than the predetermined time T (NO in step S302), the flow advances to step S303. In step S303, the value of the work area t is incremented by one, and the flow returns to step S302. If the value of the work area t is equal to or larger than the predetermined time T (YES in step S302), the flow advances to step S304. In step S304, a wake up command is issued to the connected external image storage device 12. The flow then returns to step S301 to initialize the contents of the work area t.

With the above processing, wake up commands are issued at intervals of the predetermined time T to prevent the power supply of the external image storage device 12 from automatically turning off owing to the power saving function of the device while image data is input therefrom.

The flow chart of FIG. 2 will be described again.

In step S108, image load processing of inputting image data from the connected external image storage device 12 is performed. This processing will be described in detail with reference to the flow chart of FIG. 3.

Figure 3:
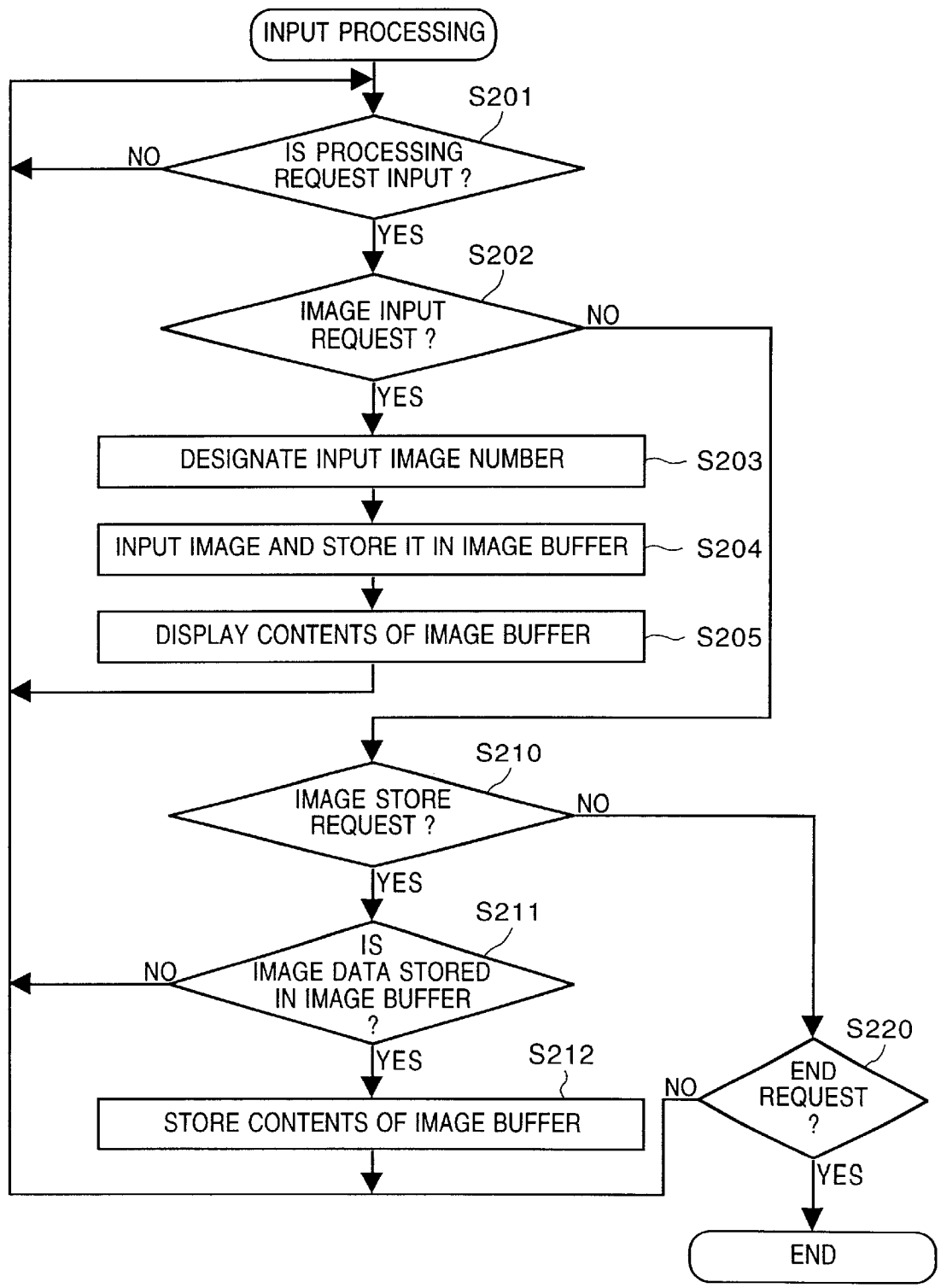
FIG. 3 is a flow chart showing the flow of image load processing in the embodiment of the present invention in detail.

FIG. 3 is a flow chart showing the flow of image load processing in the embodiment of the present invention in detail.

In step S201, it is checked whether a processing request concerning the connected external image storage device 12 is input. If no processing request is input (NO in step S201), the flow returns to step S201 again to repeat the processing until a processing request is input. If a processing request is input (YES in step S201), the flow advances to step S202. Note that the processing request is input from the KB 6 of this image processing apparatus.

In step S202, it is checked whether the processing request is an image input request for the input of image data from the connected external image storage device 12. If the request is not an image input request (NO in step S202), the flow advances to step S210. If the request is an image input request (YES in step S202), the flow advances to step S203.

In step S203, of a plurality of image data stored in the external image storage device 12, a number indicating the image data to be input is designated. This is done through the KB 6. If, for example, m (m is an integer equal to or larger than 1) image data are stored in the external image storage device 12, the number is designated by inputting an integer in the range from 1 to m. In step S204, the designated image data is input from the external image storage device 12 and stored in the image buffer 15.

The arrangement of the image buffer will be described below with reference to FIG. 7.

Figure 7:
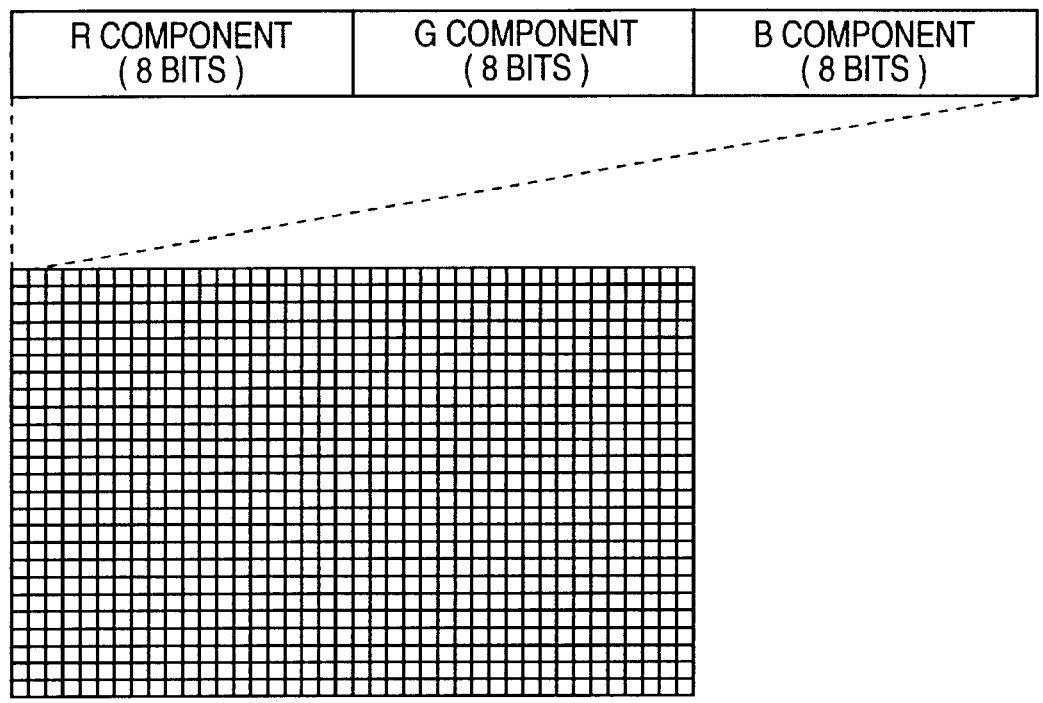
FIG. 7 is a view showing the arrangement of an image buffer in the embodiment of the present invention.

FIG. 7 shows the arrangement of the image buffer in the embodiment of the present invention.

Referring to FIG. 7, the image buffer 15 holds pixel data each consisting of 8-bit R, G, and B components and representing each pixel of input image data. These pixel data are sequentially stored in the horizonal and vertical directions in the input order.

In step S205, the image data stored in the image buffer 15 is output to the display control device 7. The image based on the image data is then displayed on the display device 8 under the control of the display control device 7.

After the image data is input from the external image storage device 12 with the above processing, the flow returns to step S201 to wait for the next processing request.

If it is determined in step S202 that the processing request is not an image input request, it is checked in step S210 whether the processing request is an image store request to store image data. If the request is not an image store request (NO in step S210), the flow advances to step S220. If the request is an image store request (YES in step S210), the flow advances to step S211.

In step S211, it is checked whether image data is stored in the image buffer 15. If no image data is stored (NO in step S211), the flow returns to step S201 to wait for the next processing request without performing image storage processing. If image data is stored (YES in step S211), the flow advances to step S212. In step S212, the image data stored in the image buffer 15 is stored in the external storage device 10.

If it is determined in step S210 that the request is not an image store request, it is checked in step S220 whether the request is an end request to end the processing. If the request is not an end request (NO in step S220), the flow returns to step S201 to wait for the next processing request. If the request is an end request (YES in step S220), the processing is terminated, and the flow advances to step S109 in the flow chart of FIG. 2.

With the above processing, image data is input from the external image storage device 12, and the input image data can be displayed on the display device 8 or stored in the external storage device 10.

The flow chart of FIG. 2 will be described again.

In step S109, it is checked whether the attribute representing the issuance of wake up commands is set in the attribute data held in the work area attr. If the attribute representing the issuance of wake up commands is not set (NO in step S109), the flow advances to step S111. If the attribute representing the issuance of wake up commands is set (YES in step S109), the flow advances to step S110.

In step S110, the wake up processing is terminated. In step S111, the input library is released, the processing is terminated.

As described above, according to this embodiment, since optimal processing for an input library is requested in accordance with the processing attributes in the attribute table for each external image storage device 12 which can be connected to the image processing apparatus, various control operations, e.g., inputting image data from the connected external image storage device 12, can be executed optimally and efficiently.

In this embodiment, the attribute representing the issuance of wake up commands has been described as attribute data registered in the input attribute table. In some external image storage device 12, however, the communication efficiency greatly decreases unless the communication line connected to the image processing apparatus is kept open. When, therefore, image data is to be input from such an external image storage device 12, a command (called an open command) for maintaining the communication line open even after image data is completely input must be issued. A predetermined bit of attribute data for the external image storage device 12 for which this open command needs to be issued is turned on to register information indicating the necessity to issue an open command in advance.

In this embodiment, a command for power supply ON/OFF control is output to the image input apparatus. For example, this command includes a command to decrease the power to save the power. In contrast to this, the command may include a command to increase the power. If an interface such as an USB for supplying power or 1394 interface is used, the present invention includes a technique of controlling power by using such an interface.

As the image data to be input to the image processing apparatus, image data is input from an image storage device such as a digital camera. The present invention is not limited to this arrangement. For example, image data input from an external device, e.g., image data input from a scanner, image data input from a host computer, and/or image data input from a network connected to the apparatus, may be input. Obviously, in this case, the input library and input attribute of each external device to be connected are registered in the input library name table and input attribute table of the image processing apparatus.

Note that the present invention may be applied to either a system constituted by a plurality of equipments (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can realize the functions of the above-mentioned embodiments to the system or apparatus, and reading out and executing the program code stored in the storage medium by a computer (or a CPU or MPU) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be realized not only by executing the readout program code by the computer but also by some or all of actual processing operations executed by an OS (operating system) running on the computer on the basis of an instruction of the program code.

Furthermore, the functions of the above-mentioned embodiments may be realized by some or all of actual processing operations executed by a CPU or the like arranged in a function extension board or a function extension unit, which is inserted in or connected to the computer, after the program code read out from the storage medium is written in a memory of the extension board or unit.

Figure 8:
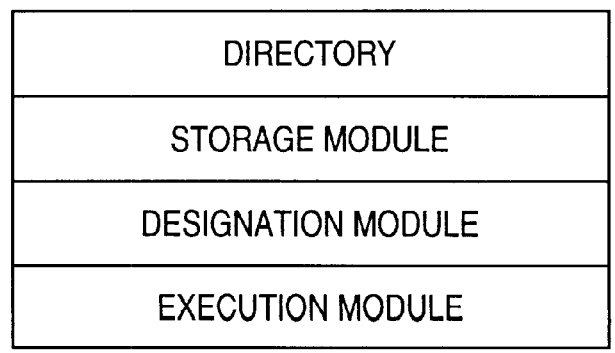
FIG. 8 is a view showing the structure of the memory map of a storage medium storing program codes for implementing the embodiment of the present invention.

When the present invention is to be applied to the above storage medium, program codes corresponding to the flow charts described above are stored in the storage medium. In brief, the modules in an example of the memory map shown in FIG. 8 are stored in the storage medium.

That is, it suffices if program codes corresponding to at least "storage module", "designation module", and "execution module" are stored in the storage medium. "Storage module" stores, in the storage device, input processing information corresponding to input processing of image data from each of a plurality of image input devices. "Execution module" designates the image input apparatus connected to the image processing apparatus. "Execution module" acquires input processing information corresponding to the designated image input device from the storage medium and executes input processing of image data from the image input device on the basis of the input processing information.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus that is connectable to a plurality of types of image input devices and receives image data from the plurality of types of image input devices, comprising:

storage means for storing power supply operation control information for the plurality of types of image input devices;

designation means for designating an image input device connected to said image processing apparatus, from the plurality of types of image input devices; and execution means for acquiring power supply operation control information corresponding to the image input device designated by said designation means from said storage means, and executing control based on the acquired power supply operation control information, wherein the acquired power supply operation control information is attribute data indicating a necessity to issue a command for keeping ON a power supply of the image input device designated by said designation means.

2. The apparatus according to claim 1, wherein said storage means further stores a procedure for performing input processing for image data from each of the plurality of types of image input devices.

3. The apparatus according to claim 1, wherein said storage means further stores a processing attribute corresponding to input processing for image data from each of the plurality of types of image input devices.

4. The apparatus according to claim 1, wherein each of the plurality of image input devices includes a power saving function of automatically turning off a power supply.

5. The apparatus according to claim 1, wherein each of the plurality of types of image input devices is a digital camera.

6. An image processing apparatus that is connectable to a plurality of types of image input devices and receives image data from the plurality of types of image input devices, comprising:

storage means for storing power supply operation control information for the plurality of types of image input devices;

designation means for designating an image input device connected to said image processing apparatus, from the plurality of types of image input devices; and execution means for acquiring power supply operation control information corresponding to the image input device designated by said designation means from said storage means, and executing control based on the acquired power supply operation control information, wherein the acquired power supply operation control information is attribute data indicating a necessity to issue a command for keeping open a communication line for connecting the image input device designated by said designation means.

7. A control method for an image processing apparatus that is connectable to a plurality of types of image input devices and receives image data from the plurality of types of image input devices, comprising:

a storage step of storing power supply operation control information for the plurality of types of image input devices in a storage medium;

a designation step of designating an image input device connected to the image processing apparatus, from the plurality of types of image input devices; and an execution step of acquiring power supply operation control information corresponding to the image input device designated in said designation step from the storage medium, and executing control based on the acquired power supply operation control information, wherein the acquired power supply operation control information is attribute data indicating a necessity to issue a command for keeping ON a power supply of the image input device designated in said designation step.

8. The method according to claim 7, wherein the storage medium further stores a procedure for performing input processing for image data from each of the plurality of types of image input devices.

9. The method according to claim 7, wherein the storage medium further stores a processing attribute corresponding to input processing for image data from each of the plurality of types of image input devices.

10. The method according to claim 7, wherein each of the plurality of image input devices includes a power saving function of automatically turning off a power supply.

11. The method according to claim 7, wherein each of the plurality of types of image input devices is a digital camera.

12. An image processing method of an image processing apparatus that is connectable to a plurality of types of image input devices and receives image data from the plurality of types of image input devices, comprising:

a storage step of storing power supply operation control information for the plurality of types of image input devices in a storage medium;

a designation step of designating an image input device connected to the image processing apparatus, from the plurality of types of image input devices; and an execution step of acquiring power supply operation control information corresponding to the image input device designated in said designation step from the storage means, and executing control based on the acquired power supply operation control information, wherein the acquired power supply operation control information is attribute data indicating a necessity to issue a command for keeping open a communication line for connecting the image input device designated in said designation step.

13. A computer-readable memory storing program codes for controlling an image processing apparatus that is connectable to a plurality of types of image input devices and receives image data from the plurality of types of image input devices, the program codes comprising:

a program code for a storage step of storing power supply operation control information for the plurality of types of image input devices in a storage medium;

a program code for a designation step of designating an image input device connected to the image processing apparatus, from the plurality of types of image input devices; and a program code for an execution step of acquiring power supply operation control information corresponding to the image input device designated in the designation step from the storage medium, and executing control based on the acquired power supply operation control information, wherein the acquired power supply operation control information is attribute data indicating a necessity to issue a command for keeping ON a power supply of the image input device designated in the designation step.

* * * * *